Feb. 9, 1971 E. M. BEAN 3,561,857
NADIR SCOPE

Filed July 12, 1968 2 Sheets-Sheet 1

INVENTOR.
Edward M. Bean
BY
Wells & St. John
ATTYS.

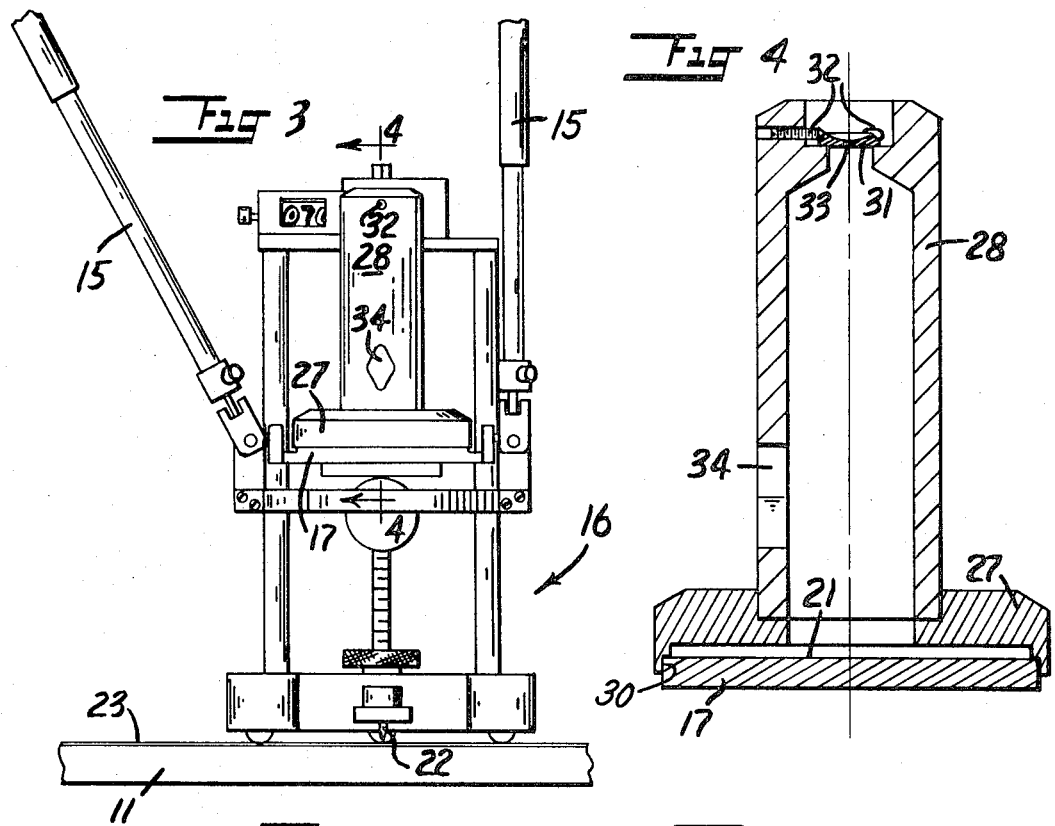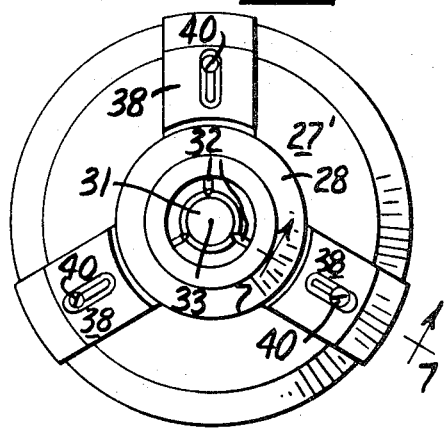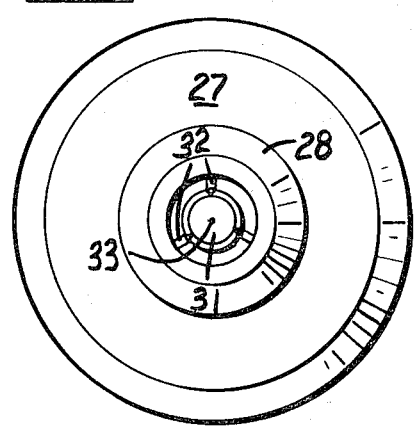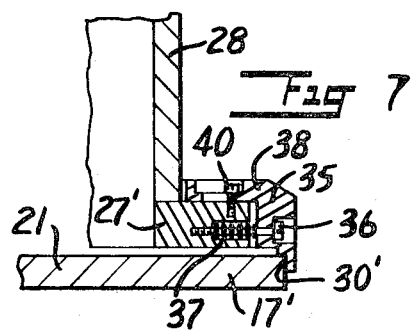

United States Patent Office 3,561,857
Patented Feb. 9, 1971

3,561,857
NADIR SCOPE
Edward M. Bean, 508 S. 3rd W.,
Missoula, Mont. 59801
Filed July 12, 1968, Ser. No. 744,374
Int. Cl. G01c 11/14
U.S. Cl. 353—6                    8 Claims

ABSTRACT OF THE DISCLOSURE

The nadir scope is for use in realigning a topographic map with a stereoscopic projector. The device comprises a mounting member positioned relative to a movable table in a predetermined attitude. A vertical focusing member is aligned along the vertical axis being related to the map and is carried on the mounting member. Use of the nadir scope permits vertical alignment and centering of a projector above selected points on the map.

BACKGROUND OF THE INVENTION

The device described herein is utilized in connection with a stereoscopic projector of the type used to project overlapping photographic images taken by a moving aerial camera and having overlapping areas used in photogrammetric procedures. An example of such a projector is the Kelsh Plotter used by the United States Geological Survey. A general disclosure of such projectors can be found in U.S. Pat. No. 2,164,847. Such projectors use a moving illumination system for projecting two images at a common surface in an overlapping condition. By means of filters and viewing glasses the user of the projector is provided with a stereoscopic image of the photographed terrain. Extremely sensitive calibration is required for proper functioning of such instruments due to the accuracy required of them. The orientation of the projector for proper use has been developed and is described in detail in prior publications such as the booklet titled "Geographical Survey Topographic Instructions" published October 1954, wherein the procedures for use of a Kelsh Plotter is described at Chapter 3 C8.

One recurring difficult adjustment met when using such a projector is the resetting of the projector when a previously drawn map is to be corrected or modified. The procedure basically requires that the two projectors be repositioned in precisely the same orientation relative to one another and the map as during the original production of the map. Conventional techniques for achieving such reorientation are very time consuming and laborious. They basically involve a procedure of correcting and overcorrecting the projector settings at various locations about the map area in question until all of the various points and settings coincide with the arrangement of the previously drawn map. This frequently requires several hours of work on the part of the user of the projector.

In realigning the projector to a previously drawn map, it is basically necessary that the map area be repositioned on the reference plane of the tabletop so that the center of each diapositive image in the two projectors can again coincide respectively with the "principal points" previously projected onto and drawn on the map. Each projector must also be vertically positioned along a plumb line or "nadir" vertically aligned above previously drawn "nadir points" indicated on the map at the foot of the perpendicular through the central projector lens axis. The present apparatus is designed to provide a visual indication of the nadir or plumb line beneath each projector to facilitate such realignment of projectors and map.

Another procedure that involves difficulty in the use of such a projector relates to the setting of the projector units when making a model carry over between adjacent areas on a map. The present apparatus readily assists in shifting the diapositive image between projector units and insuring equally accurate realignment of the previously used image and the drawn map area.

SUMMARY OF THE INVENTION

The nadir scope can only be understood in relation to the specific elements of the type of projector on which it is to be used. These elements include a horizontal tabletop, a support apparatus that extends above the tabletop and a pair of lighted projector units mounted on the support apparatus for angular and translational movement relative to one another and to the tabletop with respect to mutually perpendicular axes which intersect the respective apexes of cones of light directed individually by the projector units. A tracing table is movably supported on the tabletop and includes a platen having an upwardly facing platen surface which is parallel to the tabletop. Guide rods connect the individual projector units and the tracing table in such manner as to maintain the cones of light from the projectors in a centered condition with respect to the platen surface of the tracing able. The map and the photographic images which are projected each include an indication, such as by means of crossed lines, of the "principal points" or projections of the diapositive image centers. The map as used herein further includes crossed lines which indicate the location of the respective nadir points of the two projectors.

The present improvement, designed to assist in the realignment of the map relative to the projector units, comprises a support member having a base fitted to the platen in a predetermined position relative to the platen surface and a focusing element fixedly centered by the support member at a location above the platen surface coaxially aligned along a vertical axis that intersects the center of the platen surface. The platen surface, and thereby the focusing element, can be centered vertically above the indicated nadir points of the map, and proper focusing of the light from each projector onto the center of the platen surface serves to vertically align each projector above its previously drawn nadir point. The two projectors are thereby spaced properly from one another and are located relative to the map in the same vertical orientation as when the map was drawn. Subsequent realignment of the principal points projected by the centers of the two photographic images completes the realignment of map and projector.

It is a first object of the invention to provide an apparatus for indication of the nadir or plumb line beneath a projecting apparatus that utilizes light as the indicator. The structure thereby provides a direct check of projector alignment with respect to a previously established point on a map.

Another object of the invention is to provide a nadir scope for indication of the projector plumb line which does not require any manipulation of the conventional portions of the tracing table of such a projector.

Another object of the invention is to provide a device for indicating the nadir or plumb line beneath a projector which can be readily placed upon or removed from the apparatus without disturbing the setting of the machine.

Another object is to provide a unitary device for determination of the nadir beneath a projector which requires no handling or adjustment after being initially preset for a particular projector. It can be removed or replaced on the projector in precisely the same orientation each time. An adjustable base is provided to accommodate a slight variance in the construction of each tracing table platen.

These and further objects will be evident from the following disclosure, which is concerned with one form of the device. Modifications can be made in the physical arrangement of the parts while staying within the scope of this disclosure.

BRIEF DESCRIPTION OF THE DRAWINGS

FIG. 3 is a front view of a tracing table and the naadir scope;

FIG. 4 is a vertical cross section view through the nadir scope and platen as seen along line 4—4 in FIG. 3;

FIG. 5 is a top view of the nadir scope shown in FIG. 4;

FIG. 6 is a top view similar to FIG. 5, illustrating a modification in the base of the nadir scope; and FIG. 7 is a fragmentary vertical sectional view taken through one leg of the modified base as seen along line 7—7 in FIG. 6.

DETAILED DESCRIPTION OF THE PREFERRED EMBODIMENT

Figure 1:
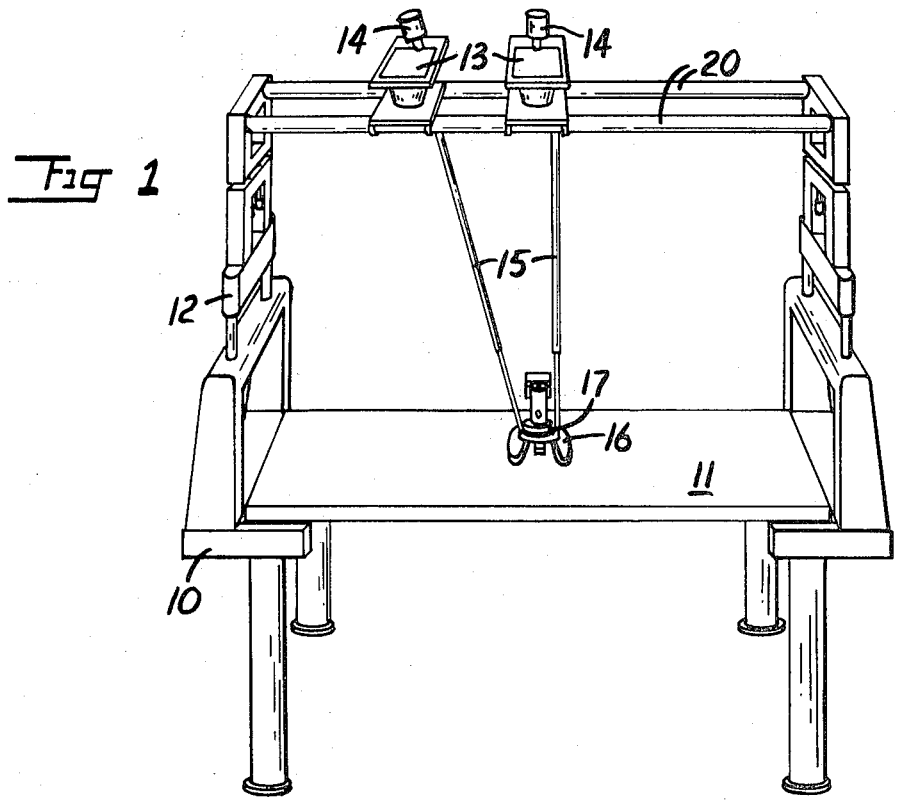
FIG. 1 is a front perspective view of the essential parts of a projector, showing the instant nadir scope in use.
Figure 2:
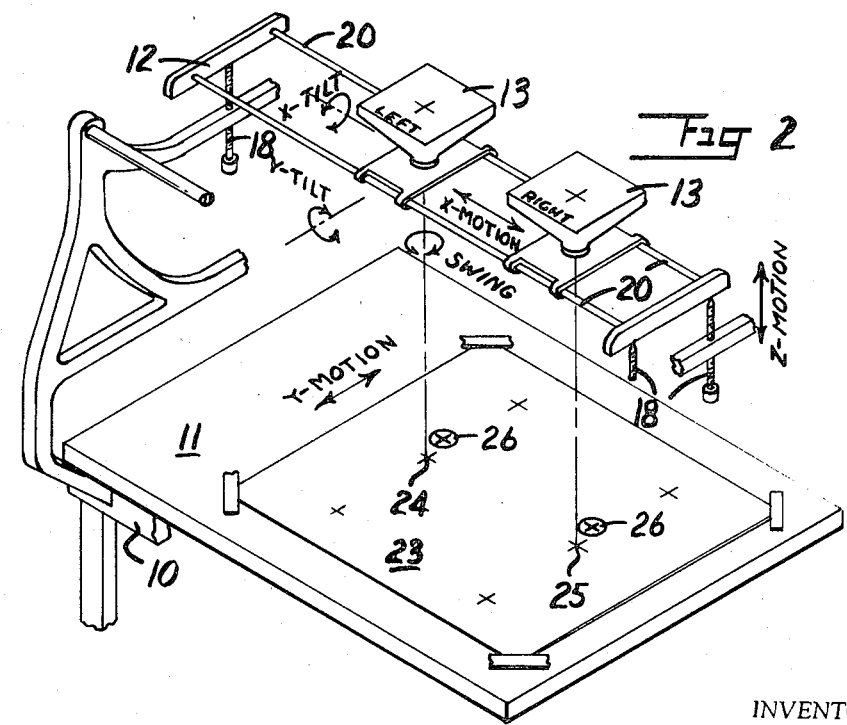
FIG. 2 is a schematic view of the projector elements and map to show the environment in which the nadir scope is used.

To understand the use of the nadir scope described below, it is first necessary to generally understand the essential features of the stereoscopic projector for plotting the topographic maps and the relationship of the projector to the drawn map with which it is to be realigned. The general features of the projector are shown in FIGS. 1 through 3. The structural details of the nadir scope are shown in FIGS. 3, 4 and 5, with an adjustable base being shown in FIGS. 6 and 7.

The stereoscopic projector can be of many types, depending upon its particular use and depending upon the nature of the work that is to be produced by it. However, similarities in operating principles and physical elements do exist in such projectors regardless of the particular manufacturer. The drawings submitted herein are based upon the features of a Kelsh Plotter as used by the Geological Survey, but it is to be understood that the description herein is equally applicable to similar projectors of other manufacturers.

The stereoscopic projector is used to recreate natural terrain features by projecting images of two overlapping aerial photographs which are properly oriented to each other and to the datum. Two projectors are used, with light from a lamp in each passing through filters and a glass diapositive containing the photographic image, the light being condensed by a projector lens assembly and forming an image on a viewing screen. In a conventional apparatus, two properly oriented projectors are used simultaneously, one bearing a red filter and the other a blue filter. The diapositives used represent two overlapping photographs in the same flight strip. The pattern formed by the images projected on the viewing screen in two colors constitutes an anaglyph. When viewing the anaglyph the observer wears spectacles having one red and one blue lens. The combined visual effect of the simultaneous views through the spectacles provides perception of a three-dimensional model. A floating mark centered in the surface of the viewing screen, or platen, provides vertical measurement within the stereoscopic model. Vertical movement is obtained by raising or lowering the platen. Horizontal motion is obtained by moving the platen across the tracing table. Such movement horizontally is recorded by a pencil or pointer, the scale of movement being typically reduced by means of a pantograph (not shown).

The main components of the projector as shown in FIG. 1 are the supporting table frame 10, the tabletop 11, the support frame structure 12 that extends above the tabletop, the two projector units 13 and associated illuminating units 14, two guide rods 15 and the tracing table 16 which includes the platen 17, which serves as the viewing screen for the projected images.

The tabletop, which is the plane surface on which the map is drawn and located during use of the projector, lies in a horizontal plane, being level and fixedly held in such a horizontal plane by various adjustments provided in the table frame 10. The support frame structure 12 is vertically positioned relative to the tabletop by adjustable screws 18 (FIG. 3). The screws 18 provide means for positioning the support frame structure 12 at the desired height above the tabletop. The support frame structure 12 includes parallel bars 20 that provide a track along which the two projector units 13 can be moved in the x-direction as indicated in FIG. 2. The particular projector illustrated does not provide individual movement of each projector unit relative to the support frame structure along the y-axis and the z-axis, but this is provided in other projector assemblies. The nadir scope described herein is equally adaptable to use in such projectors. The individual projectors can be rotated by a swing motion to effect a change in the azimuth of the diapositive. Each projector is also provided with means for universal adjustment of the tilt about the x-axis and the y-axis.

The tracing table 16 is slidably or otherwise movably supported on the tabletop 11. It includes a vertically movable platen 17 in the form of a circular disc having an upwardly facing plane surface 21. The plane of the surface 21 is horizontal and maintained parallel to the plane of the tabletop 11. The surface 21 provides a view surface for the projected images from the projector unit 13. A visible mark in the form of two perpendicular crossed lines is provided on the surface 21 at the center thereof. As shown, a pointer 22 is provided on the tracing table 16. The pointer 22 being illustrated as a pen or a pencil used to directly draw upon a sheet of paper or map 23 on tabletop 11. When a pantograph is used, pointer 22 is coupled to the pantograph arms in the known fashion.

The guide rods 15 comprise straight telescoping sections which are attached to the illuminating units 14 and the tracing table 16 in a fixed relationship so that the cone of light from each projector unit 13 is centered on the platen surface 21. Movement of the tracing table 16 relative to the tabletop 11 is transmitted through the guide rods 15 to cause tilting of the illuminating units 14 in such fashion as to maintain the centering of the cone of light on the platen surface 21, since the tilt axes for the units 14 intercept the respective apexes of the cones of light. Projector units 13 remain stationary during use.

The nadir scope described herein is used during the initial drawing of a map to assist in the location of the projector "nadir points," the two points on the map along plumb lines through the center of each projector unit 13. Also, each diapositive image and the map will have marked thereon a center point indicated by two intersecting lines, the two center points of the images being coincident with the center indicator on the map when the map is drawn. As shown in FIG. 2, the left nadir point is indicated at 24 and the right nadir point is indicated at 25. The centers of the diapositive images of the two projector units are indicated by the intersecting lines 26.

The nadir scope comprises an upright tubular base 27 and an upstanding hollow tube 28. The tube 28 is shown in a cylindrical shape, but could be made in any desired shape. In FIGS. 3, 4 and 5, base 27 is a solid annular structure fixed to tube 28. It has an outer dimension greater than the width of plate 17 and is supplied with a lower shoulder 30 that is complementary in size to the outside periphery of the platen.

The base 27 and tube 28 are provided as a support member for a focusing means to direct light upon platen 17 in a controlled manner. At the upper end of tube 28 is mounted an opaque plate in the form of a disc 31, held in place by three screws 32 threadably engaged through the tube 28. The screws 32 have conically pointed inner ends which fit against a tapered outer edge about the periphery of disc 31. By selectively loosening and tightening of the screws 32, one can slightly vary the position of disc 31 in order to initially align the disc 31 as required. At the center of disc 31 is a pinhole extending through the disc 31 and indicated generally at 33. The pinhole permits only a very small portion of light from a projector to pass to the platen surface, so that the location of the light suorce above the pinhole can be visually references relative to the center of surface 21.

The tube 28 is provided with a side aperture at 34, the aperture being located adjacent to the base 27 and being of a suitable size and shape to permit one to view the center of the platen surface 21 through aperture 34 while restricting the entrance of exterior light that might tend to obscure the surface being viewed.

The object of the nadir scope is to provide a visual indicator by which one can optically align each projector unit 13 above a chosen point on the map 23. Therefore, it is necessary to initially calibrate the instrument for a particular projector by fitting base 27 on the platen 17 and by adjustment of disc 31 so that the location of pinhole 33 is exactly aligned along a vertical axis that is coaxial with the center of the platen surface 21. This can be accomplished by trial and error, using conventional measuring and alignment procedures and instruments. Once this has been accomplished one should mark the base 27 and the edge of plate 17 so that the nadir scope can be angularly indexed each time it is placed on platen 17. A simple visual mark on each will suffice. Assuming that base 27 is properly reseated on the platen 17, the desired vertical alignment of the pinhole 33 will be achieved without manipulation or adjustment beyond such initial setting.

In FIGS. 6 and 7 is illustrated a slight modification of the base 27' to provide an adjustable base structure that can be fit to any platen 17'. The base 27' is simply recessed at three equally spaced locations to slidably support legs 35, which are provided with lower shoulders 30' that adjustably engage the periphery of the platen 17'. The legs 35 are radially adjustable relative to base 27'. Adjustment is made by means of radial screws 36 threadably engaged with the base 27'. Compression springs 37 yieldably urge the legs 35 outwardly against the stop provided by the head of each screw 36. Each leg 35 has an upper horizontal section 38 that overlaps the base 27'. Locking screws 40 are threadably engaged within base 27' and received through the sections 38 within radial slots. By tightening of screws 40, each leg 35 is locked in the radial position required to center base 27' on the platen 17'. The initial alignment of the disc 31 can then be accomplished and the entire apparatus once set for a particular platen 17', need not be additionally disturbed. Again, the base 27' should be angularly indexed relative to platen 17' by matching individual indicator lines.

In use, the realignment of map 23 is accomplished by placing the nadir scope on the platen 17 and moving the tracing table 16 to a position wherein the pointer 22 is centered at the nadir point of the projector unit being set. The projector unit is then adjusted along its movable axes until the light from the projector unit passing through the pinhole 33 is centered on the center indicator marked on the platen surface 21. The centering of the light as viewed through aperture 34 provides an indication that the projector unit is coaxially aligned vertically above the nadir point previously drawn on the map. An identical operation is then carried out with respect to the main projector unit. Finally, the nadir scope is removed from the platen and the principal points on the map are checked with respect to the two center indications of the diapositive images. Angular adjustment of the projector units might be necessary in order to cause these center indications of the respective diapositive images to coincide with the drawn principal points 26. The two projector units are then in precisely the same relative positions with respect to map 23 as when the map 23 was first drawn. One can then project images onto the map 23 for purposes of corrections or changes.

When drawing a map initially, the nadir scope is utilized on the platen to locate the respective nadir points beneath each projector, by aligning the light through the pinhole onto the platen center and suitably indicating the point of such alignment by crossed lines on the map.

The nadir scope is also most useful in assisting the projector operator to carry over from one diapositive image to the next in a sequential mapping operation. As discussed previously, the projector nadir points and principal points (projected diapositive centers) are recorded on the drawn map. The operator also should take a vertical reading on a small Image Point within the next area of the model, in close proximity to the indicated nadir point, recording this reading and location also on the map. The diapositive can then be removed and one image transferred from one projector unit to the other, depending upon the direction of the flight sequence.

The nadir scope is then used to realign the projector of the transferred image, with the nadir point on the map previously drawn under the other projector, moving map 23 on tabletop 11 as necessary. The repositioned map is then realigned with the projector to which the image was transferred by moving the pointer of the tracing table 16 directly above the corresponding principal point and manipulating the projector unit 13 to bring the projected diapositive center onto the indicated center of the platen surface 21. This transfers the orientation of one projector to the other. Vertical adjustment can be made also, using the recorded Image Point and reading as a guide. The next image in a sequence can then be placed in the remaining projector unit 13 and superimposed upon the realigned projected image on platen surface 21.

Modifications might be made in the structure of the nadir scope. If desired, a lens system could be used for focusing light vertically at the center of the platen surface 21. If a lens system were adapted, it might include a reflex viewer so that the user could view the center of the platen surface 21 through the same lens system through which the light was being focused. The basic arrangement with which this disclosure is concerned is comprised of the mounting base fitted to the platen, a support arrangement above the base and fixed to it, and a focusing element of one type or another fixed to the support in order to provide a visual alignment of the rays of light upon the center of the platen surface.

Having thus described my invention, I claim:

1. In combination with a stereoscopic projector of the type used for plotting topographic maps wherein the projector comprises:

a horizontal tabletop;

a support apparatus extending above the tabletop;

a pair of lighted projector units, each projector unit directing a column of light toward the tabletop, the projector units being mounted on the support apparatus for angular and translational movement relative to one another with respect to mutually perpendicular axes through the respective apexes of the cones of light;

a tracing table movably supported on the tabletop, including a platen having an upwardly facing surface on which the cones of light are centered, said surface being maintained parallel to the table top; and guide rods connecting the projector units and the tracing table to thereby maintain the cones of light in a centered condition relative to the tracing table surface regardless of the position of the tracing table on a model area on the table surface;

and a previously drawn may made with the aid of the projector from overlapping photographic images projected onto the platen by the projector units, each image and the map having the projected image centers indicated thereon and the map having indicated thereon the two nadir points vertically beneath the respective projectors;

an improvement for facilitating the alignment of a map with respect to a projector by permitting the relocation of the projector above a previously drawn nadir point on the map, said improvement comprising:

a rigid support member having a base fitted to the platen in a predetermined position relative to the tracing table surface;

focus means on said support member positioned above the platen surface and aligned along a vertical axis intersecting the center of the tracing table surface for transmission of light to a relatively small portion of the platen surface in relation to the total area thereof;

and means on said support member for permitting one to view that portion of the platen surface to which light is transmitted by said focus means.

2. The apparatus in claim 1 wherein the base of said support member is in the form of an upright tubular configuration having an outside width in excess of the width of the tracing table surface, said base being provided with a downwardly and inwardly facing peripheral shoulder along the lower surface thereof complementary in size and shape to the periphery of the tracing table surface.

3. The apparatus in claim 1 wherein the base of said support member is in the form of an upright tubular configuration having a plurality of radially movable legs projecting downwardly therefrom, the legs being provided with a downwardly and inwardly shoulder configuration along the lower surfaces thereof complementary in size and shape to the periphery of the tracing table surface.

4. The apparatus in claim 3 wherein the base of said support member further comprises locking means for selectively fixing the position of each leg on said base.

5. The apparatus in claim 1 wherein said support member comprises a solid tubular element extending upwardly from said tracing table surface and enclosing a portion of the tracing table surface;

said last-named means permitting one to view the tracing table surface enclosed by the support member.

6. The apparatus in claim 5 wherein said focus means comprises:

a solid opaque plate extending across the tubular element at an elevtaion above the tracing table surface, said plate having a vertical pinhole formed therethrough in vertical coaxial alignment with the center of the tracing table surface.

7. The apparatus in claim 6 further including adjustment means movably mounting the plate within the tubular element for permitting proper alignment of the plate relative to the tracing table surface.

8. The apparatus in claim 1 wherein said support member comprises a solid tubular element extending upwardly from said tracing table surface and enclosing a portion of the tracing table surface;

said last-named means comprising an aperture formed through the tubular element adjacent to its base.

References Cited

UNITED STATES PATENTS 2,492,870   12/1949   Kelsh _____ 353—6

HARRY N. HAROIAN, Primary Examiner

U.S. Cl. X.R.

33—20